(12) United States Patent
Ji et al.

(10) Patent No.: US 8,611,375 B2
(45) Date of Patent: Dec. 17, 2013

(54) METHOD FOR EMBS-UNICAST INTERACTIVITY AND EMBS PAGING

(75) Inventors: Baowei Ji, Plano, TX (US); Kaushik Josiam, Dallas, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 1119 days.

(21) Appl. No.: 12/380,051

(22) Filed: Feb. 23, 2009

(65) Prior Publication Data

US 2010/0061286 A1    Mar. 11, 2010

Related U.S. Application Data

(60) Provisional application No. 61/191,084, filed on Sep. 5, 2008.

(51) Int. Cl.
*H04J 1/00* (2006.01)

(52) U.S. Cl.
USPC ........... 370/486; 370/400; 370/422; 370/367; 370/432

(58) Field of Classification Search
USPC .................. 370/312, 367, 400, 422, 432, 486
See application file for complete search history.

(56) References Cited

U.S. PATENT DOCUMENTS

| | | | | |
|---|---|---|---|---|
| 5,329,590 A | * | 7/1994 | Pond | 380/242 |
| 7,062,528 B2 | * | 6/2006 | Deguchi | 709/203 |
| 7,336,659 B2 | * | 2/2008 | Meago | 370/432 |
| 7,400,889 B2 | * | 7/2008 | Balasubramanian et al. | 455/452.2 |
| 7,403,790 B2 | * | 7/2008 | Balachandran et al. | 455/518 |
| 7,787,893 B2 | * | 8/2010 | Jeong et al. | 455/464 |
| 7,970,002 B2 | * | 6/2011 | Hu | 370/432 |
| 8,073,433 B2 | * | 12/2011 | Balestrieri | 455/414.1 |
| 2002/0111134 A1 | * | 8/2002 | Salurso et al. | 455/3.06 |
| 2002/0199209 A1 | * | 12/2002 | Shiga | 725/136 |
| 2004/0029596 A1 | * | 2/2004 | Kim et al. | 455/458 |
| 2007/0136758 A1 | * | 6/2007 | Lehikoinen et al. | 725/53 |
| 2008/0037460 A1 | * | 2/2008 | Venkatachalam | 370/328 |
| 2009/0046637 A1 | * | 2/2009 | Kim et al. | 370/329 |
| 2009/0113487 A1 | * | 4/2009 | Nanjunda Swamy | 725/62 |

FOREIGN PATENT DOCUMENTS

WO    WO2008/062979    *    5/2008

* cited by examiner

*Primary Examiner* — Ricky Ngo
*Assistant Examiner* — Dewanda Samuel

(57) ABSTRACT

A method of paging a mobile station is provided. The method includes requesting to receive a page that announces when a program is to be broadcast. The method also includes sending the page to the mobile station before the program is to be broadcast. The method further includes receiving the page at the mobile station. A method for providing interactive feedback in a wireless communication network is also provided. The method includes broadcasting a program from a server to a mobile station. The method also includes receiving at least part of the program at the mobile station. The method further includes providing feedback about the program from the mobile station.

20 Claims, 4 Drawing Sheets

METHOD FOR EMBS-UNICAST INTERACTIVITY AND EMBS PAGING

CROSS-REFERENCE TO RELATED APPLICATION(S) AND CLAIM OF PRIORITY

The present application is related to U.S. Provisional Pat. No. 61/191,084, filed Sep. 5, 2008, entitled "METHOD FOR EMBS-UNICAST INTERACTIVITY AND EMBS PAGING". Provisional Pat. No. 61/191,084 is assigned to the assignee of the present application and is hereby incorporated by reference into the present application as if fully set forth herein. The present application hereby claims priority under 35 U.S.C. §119(e) to U.S. Provisional Patent No. 61/191,084.

TECHNICAL FIELD OF THE INVENTION

The present application relates generally to wireless communication systems and, more specifically, to a method for EMBS paging and unicast interactivity.

BACKGROUND OF THE INVENTION

Enhanced Multicast Broadcast System (EMBS) is a broadcasting system that is offered over existing wireless networks, such as those utilizing GSM, UMTS, or OFDMA. EMBS is known by other names, such as Evolved Multimedia Broadcast Multicast Service, E-MBMS, E-MBS, eMBMS and (e)MBMS. These names can be used interchangeably, and refer to the same transmission system.

EMBS is a point-to-multipoint communication system where data packets are transmitted simultaneously from a single source to multiple destinations. The term broadcast refers to the ability to deliver contents to all users. Radio and television contents are examples of broadcast transmissions. Multicast refers to contents that are directed to a specific group of users that have an associated subscription for receiving such services. For example, a group of users interested in sports or news broadcasts could make up a multicast group. In the cellular context, Mobile TV is one example of a multicast broadcast service. The IEEE 802.16m standard supports enhancements to the multicast broadcast service that will enable operators to provide full triple-play service offerings—telephony, internet and TV—for mobile handheld devices.

To improve user experience, IEEE 802.16m has targeted improvements in the content delivery and efficiency of EMBS. However, currently, there is no detailed standard for carrying out the interaction of EMBS users to EMBS content in E-UTRAN, IEEE 802.16 or UMB. While EMBS happens mainly in downlink, there is significant interest in allowing a mobile station to interact with a base station and the EMBS content server to facilitate bi-directional EMBS communication.

SUMMARY OF THE INVENTION

A method of paging a mobile station is provided. The method includes requesting to receive a page that announces when a program is to be broadcast. The method also includes sending the page to the mobile station before the program is to be broadcast. The method further includes receiving the page at the mobile station.

A wireless network comprising a plurality of mobile stations is provided. Each mobile station is configured to request to receive a page that announces when a program is to be broadcast. Each mobile station also is configured to receive the page, where the page is sent before the program is to be broadcast.

A method for providing feedback in a wireless communication network is provided. The method includes broadcasting a program from a server to a mobile station. The method also includes receiving at least part of the program at the mobile station. The method further includes providing feedback about the program from the mobile station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIG. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

With regard to the following description, it is noted that the 3GPP Long Term Evolution (LTE) term "node B" is another term for "base station" used below. Also, the terms "user equipment", "subscriber station", and "mobile station" all refer to the same category of equipment, and are used interchangeably below.

Figure 1:
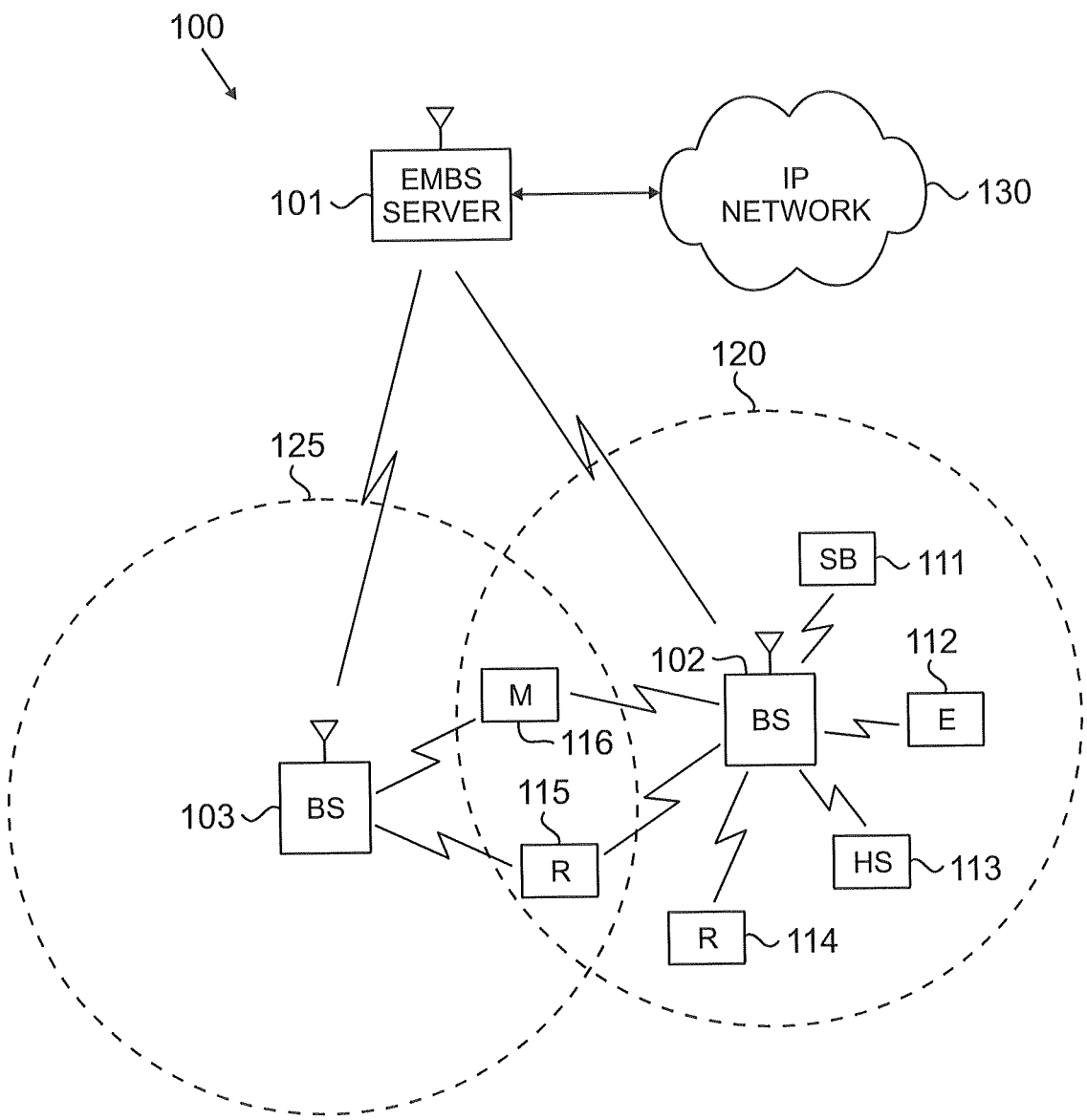
FIG. 1 illustrates an Orthogonal Frequency Division Multiple Access (OFDMA) wireless network according to one embodiment of the present disclosure.

FIG. 1 illustrates an exemplary Orthogonal Frequency Division Multiple Access (OFDMA) wireless network 100 according to one embodiment of the present disclosure. In the illustrated embodiment, wireless network 100 includes EMBS server 101, base station (BS) 102, and base station (BS) 103. EMBS server 101 communicates with base station 102 and base station 103. EMBS server 101 also communicates with Internet protocol (IP) network 130, such as the Internet, a proprietary IP network, or other data network.

Base station 102 provides wireless broadband access to network 130, via EMBS server 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Each subscriber station (SS) may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via EMBS server 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through EMBS Server 101.

In other embodiments, EMBS server 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in handoff mode, as known to those of skill in the art.

In an exemplary embodiment, EMBS server 101 and base stations 102-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. EMBS server 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 102 or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from EMBS server 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

Figure 2:
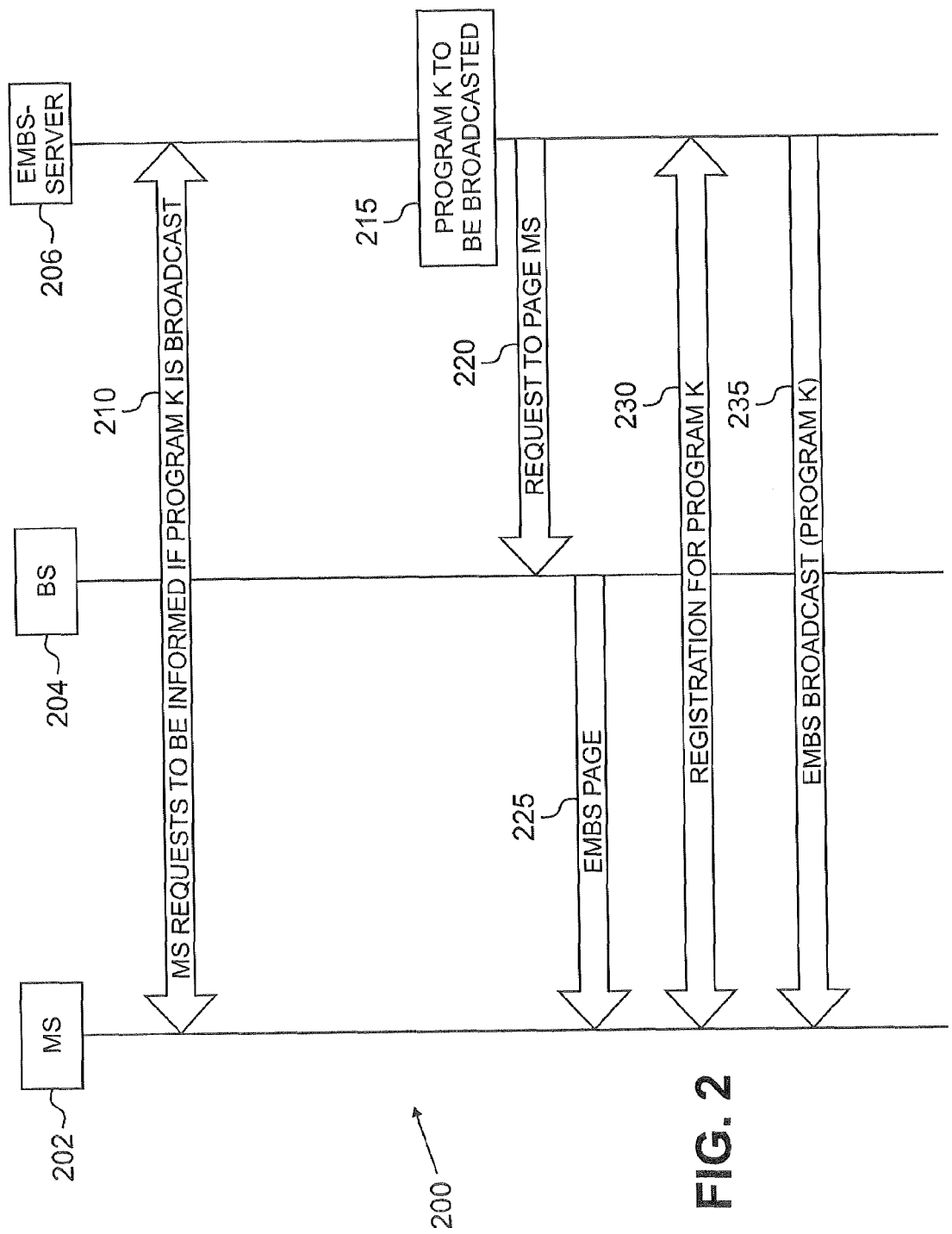
FIG. 2 illustrates an EMBS paging method according to one embodiment of the present disclosure.

FIG. 2 illustrates an EMBS paging method 200 according to embodiments of the present disclosure. The embodiment of the EMBS paging method 200 shown in FIG. 2 is for illustration only. Other embodiments of the EMBS paging method 200 could be used without departing from the scope of this disclosure.

FIG. 2 includes a mobile station 202, a base station 204, and an EMBS server 206 in a wireless network environment, such as network 100 depicted in FIG. 1. In certain embodiments, mobile station 202 could be similar to mobile stations 111-116 of FIG. 1. Mobile station 202 may also represent a user of a mobile station, for example, a cell phone user. In certain embodiments, base station 204 could be similar to base stations 102 and 103 of FIG. 1. In certain embodiments, EMBS server 206 could be similar to EMBS server 101 of FIG. 1.

The EMBS paging method 200 illustrated in FIG. 2 allows mobile station 202 to pre-register for certain EMBS content, then receive a page announcing when the EMBS content is about to be broadcast. In Step 210, mobile station 202 requests to be informed, or paged, if and when a particular program (program K) will be broadcast. Program K can represent any scheduled broadcast, such as a sporting event or a musical concert. The mobile station 202 could send the request for EMBS paging to the EMBS Server 206 directly, or via base station 204.

At a later time, program K is ready to be broadcast on network 100, as shown in Step 215. In Step 220, EMBS server 206 notes the request from mobile station 202. EMBS server 206 sends a request to all base stations in the EMBS paging zone, including base station 204, to page mobile station 202. Base station 204, like other base stations in the EMBS paging zone then sends an EMBS page to mobile station 202, as shown in Step 225. The EMBS page notifies mobile station 202 that the broadcast of program K is about to begin. In some embodiments, mobile station 202 could be paged if it is in idle mode. The page could cause mobile station 202 to wake up and switch to active mode, or mobile station 202 could prepare the reception of EMBS program K while staying in idle mode. In other embodiments, mobile station 202 could be informed about the availability of the broadcast through other messages if it is in active mode.

In certain embodiments, mobile station 202, having been paged, could receive the broadcast of program K directly and without additional registration. In other embodiments, mobile station 202 may be required to formally register to be permitted to receive or play the broadcast of program K, as shown in Step 230. In Step 235, program K is broadcast from EMBS server 206 to mobile station 202 via base station 204. In every embodiment, EMBS paging method 200 provides for EMBS-unicast interactivity.

As an example of the EMBS paging method of FIG. 2, a mobile phone user may wish to watch a football game on his mobile phone. The user pre-registers his interest in the football game with the EMBS server. Later, when the game is about to be broadcast, the user receives a page on his mobile phone that informs him that the game will be broadcast shortly. The user may need to register on his mobile phone to receive or play the game broadcast. Or the game may be available for viewing without additional registration. Then the user accesses and watches the broadcast of the football game on his mobile phone. This example is by way of illustration only and should not be construed in any way to limit the scope of the disclosure.

Figure 3:
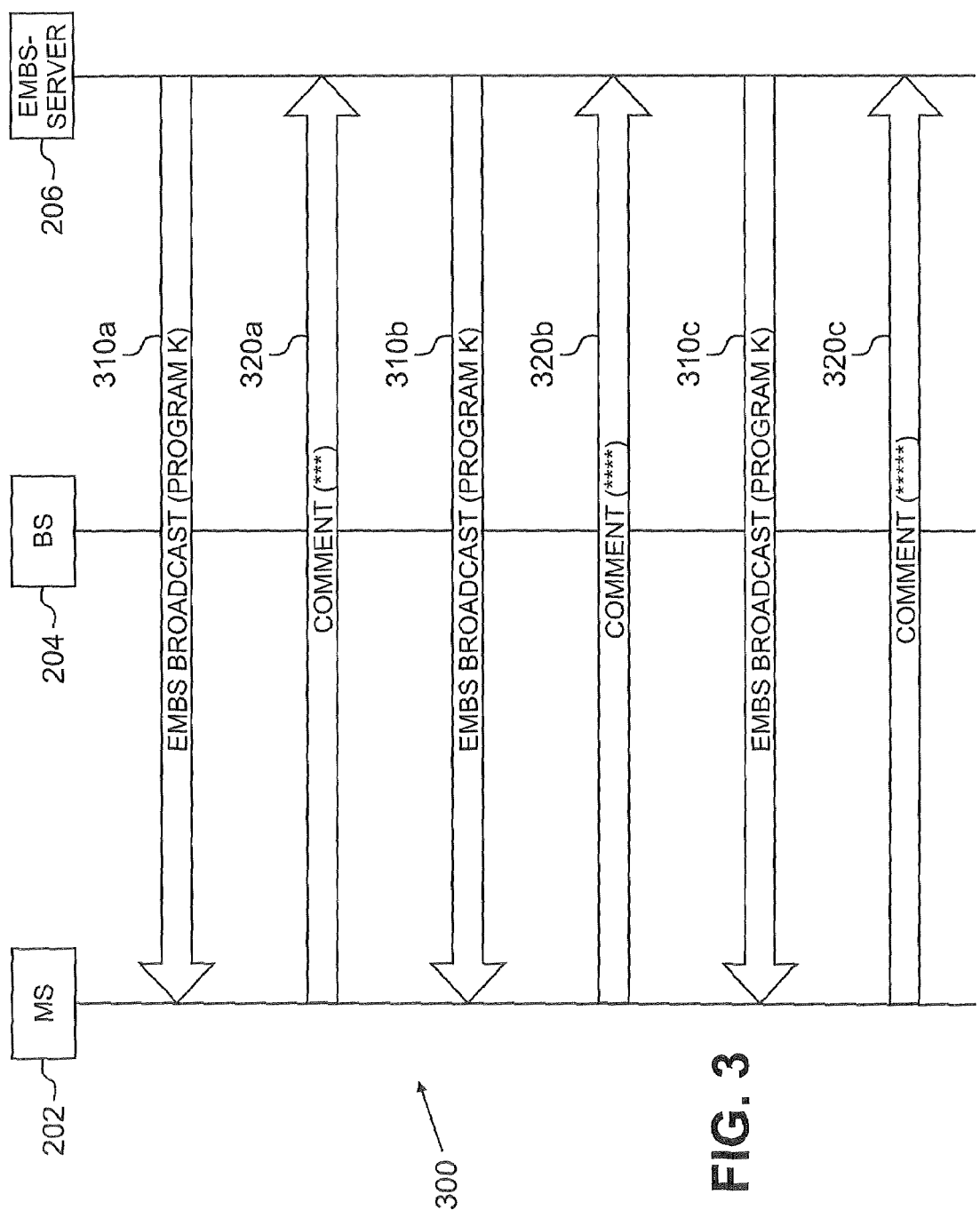
FIG. 3 illustrates a method for providing real-time, interactive user feedback or action during an EMBS broadcast, according to one embodiment of the present disclosure.

FIG. 3 illustrates a method 300 for providing real-time, interactive user feedback or action during an EMBS broadcast, according to one embodiment of the present disclosure. The embodiment of method 300 shown in FIG. 3 is for illustration only. Other embodiments of method 300 could be used without departing from the scope of this disclosure.

FIG. 3 includes mobile station 202, base station 204, and EMBS server 206 in a wireless network environment, such as network 100. In Step 310a, EMBS server 206 broadcasts a portion of program K to mobile station 202 via base station 204. Upon receiving the portion of program K at mobile station 202, a user associated with mobile station 202 may wish to provide feedback, comment, or other action to EMBS server 206 about program K or other related content, as shown in Step 320a. For example, program K could represent a televised debate, and the user of mobile station 202 could be part of a focus group that responds in real-time to discussion in the debate.

In certain embodiments, the user could provide feedback by pressing one or more specific buttons on mobile station 202. Each specific button could be associated with a particular feedback response. For example, one button could be associated with a "yes" response, and another button could be associated with a "no" response. In other embodiments, the feedback could include the user sending an entire message. The feedback is provided to EMBS server 206 on an uplink unicast transmission.

Following, or concurrently with, the transmission of feedback from the user of mobile station 202, EMBS server 206 may broadcast another portion of program K to mobile station 202, as shown in Steps 310b and 310c. After each broadcast of the portion of program K, the user of mobile station 202 may have an opportunity to provide feedback to EMBS server 206, as shown in Steps 320b and 320c. In certain embodiments, the feedback provided from mobile station 202 to EMBS server 206 might relate to the most recently broadcast portion of program K, or it might relate to an earlier portion of program K. In other embodiments, the feedback might be related to future portions of program K that the user wishes to view. In certain embodiments, the feedback provided from mobile station 202 may influence or change the content or broadcast of later portions of program K.

Figure 4:
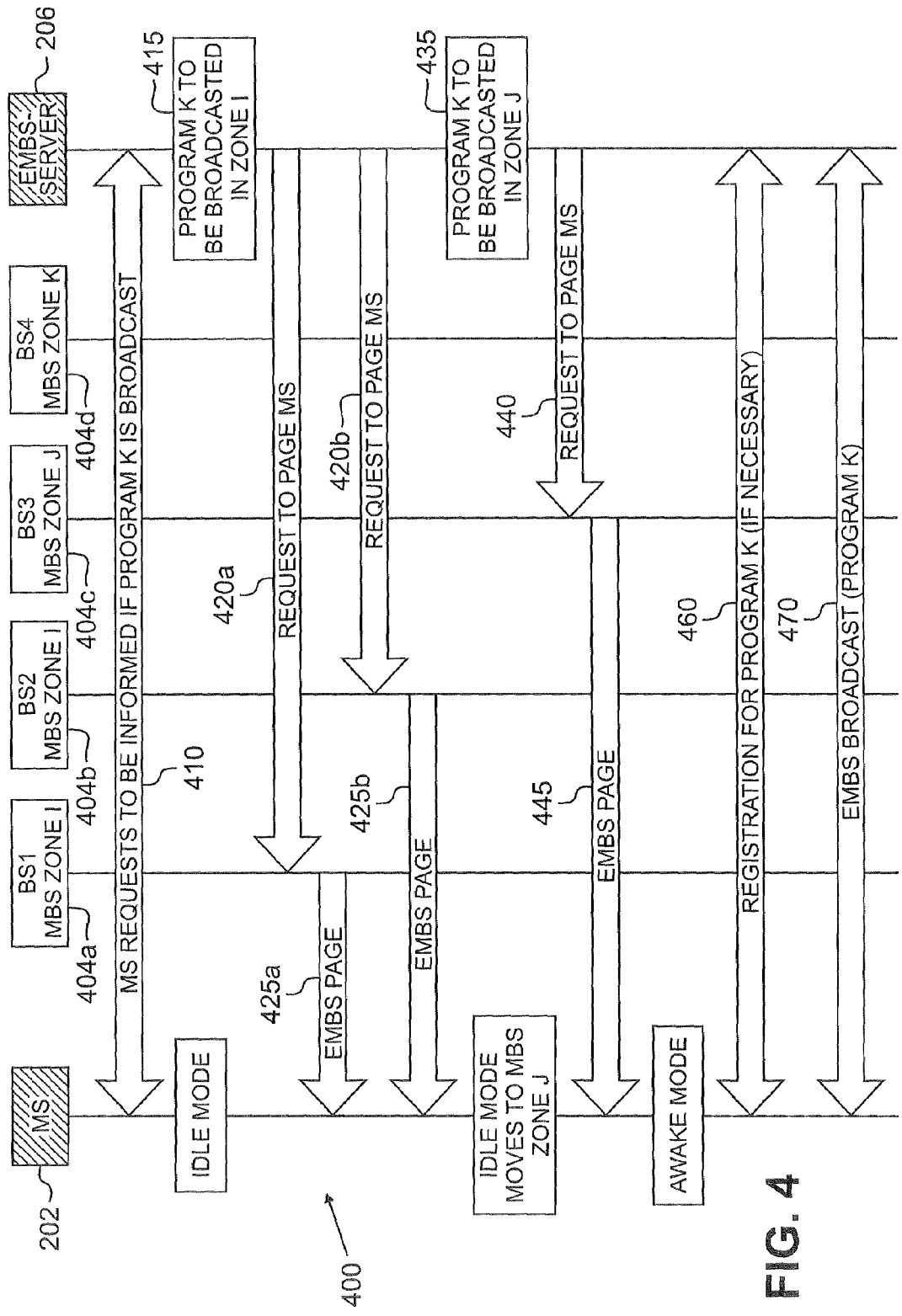
FIG. 4 illustrates a zone-specific EMBS page method according to one embodiment of the present disclosure.

FIG. 4 illustrates a zone-specific EMBS page method 400 according to one embodiment of the present disclosure. The embodiment of the zone-specific EMBS paging method 400 shown in FIG. 4 is for illustration only. Other embodiments of the zone-specific EMBS paging method 400 could be used without departing from the scope of this disclosure.

FIG. 4 includes mobile station 202 and EMBS server 206 in a wireless network environment, such as network 100. FIG. 4 also includes a plurality of base stations 404a-404d in the wireless network environment. In an exemplary embodiment, base stations 404a and 404b are in zone I, base station 404c is in zone J, and base station 404d is in zone K. In certain embodiments, zones I, J, and K could represent different geographical areas. In certain embodiments, the different geographical areas could be located in different time zones. While three zones and four base stations are shown in FIG. 4, it is understood that the wireless network environment may include more or fewer zones, and each zone may have more or fewer base stations.

In Step 410, mobile station 202 sends a request to be informed if and when a particular program (program K) will be broadcast. At the time of the request, mobile station 202 is located in one of the zones represented by base stations 404a-404d. Mobile station 202 could send the request to the EMBS Server 206 directly, or via a base station. In an exemplary embodiment, mobile station 202 is located in zone I, so mobile station 202 could send the request to the EMBS Server 206 via either base station 404a or base station 404b. The request is then forwarded to EMBS server 206.

At a later time, program K is ready to be broadcast on the network in zone I, as shown in Step 415. Because of differences between zones I, J, and K (e.g., time zone differences), program K may be broadcast in zone I at one time, in zone J at a later time, and in zone K at a still later time. For example, program K could represent a television show that is broadcast at one time in one time zone, and at later times in other time zones. In such an example, it would be an unnecessary use of network resources to page all interested mobile stations every time program K is to broadcast in any zone. It is more advantageous to page only the mobile stations located in the zone or zones where program K is about to be broadcast.

In Step 420, EMBS server 206 notes the request from mobile station 202. Because mobile station 202 is located in zone I, EMBS server 206 requests base station 404a (in Step 420a) and base station 404b (in Step 420b) to page mobile station 202. In Step 425, base stations 404a and 404b then send an EMBS page to mobile station 202. The EMBS page notifies mobile station 202 that program K is about to be broadcast in zone I. Alternatively, if mobile station 202 is in active mode with one of the base stations, the base station could inform mobile station 202 of the broadcast event via unicast message, if it is not required to use the common broadcast paging ID or a multicast paging ID for paging other mobile stations.

In certain embodiments, mobile station 202, having been paged, could receive the broadcast of program K directly and without additional registration, as shown in Step 470. In other embodiments, mobile station 202 may be required to formally register to be permitted to receive or play the broadcast of program K, as shown in Step 460. In Step 470, program K is broadcast from EMBS server 206 to mobile station 202.

In certain embodiments, mobile station 202 may have moved from zone I to zone J before receiving an EMBS page. As a result of the move, mobile station 202 may no longer desire or be able to receive an EMBS page from base stations 404a and 404b. Also as a result of the move, mobile station 202 may no longer desire or be able to receive program K when it is broadcast in zone I. Instead, mobile station may prefer to receive program K when it is broadcast in zone J.

At a later time, program K is ready to be broadcast on the network in zone J, as shown in Step 435. Because mobile station 202 is now located in zone J, EMBS server 206 requests base station 404c, located in zone J, to page mobile station 202, as shown in Step 440. In Step 445, base station 404c then sends an EMBS page to mobile station 202. The EMBS page notifies mobile station 202 that program K is about to be broadcast in zone J. As noted above, in certain embodiments, mobile station 202, having been paged, could receive the broadcast of program K directly and without additional registration, as shown in Step 470. In other embodiments, mobile station 202 may be required to formally register to be permitted to receive or play the broadcast of program K, as shown in Step 460. In Step 470, program K is broadcast from EMBS server 206 to mobile station 202.

The EMBS page could also be carried out using a single broadcast ID for all the mobile stations that have requested this kind of paging. In this case, each mobile station monitors this common broadcast ID, rather than its own mobile station ID for the detection of the EMBS page.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. For use in an Evolved Multicast Broadcast System (EMBS) wireless communication network comprising a plurality of base stations, a method for providing point-to-multipoint communications to a plurality of mobile stations, the method comprising:
   receiving from a first mobile station a request to be notified of a start time when a selected program will be broadcast;
   transmitting to the first mobile station a first message that indicates the start time when the selected program will be broadcast;
   at the start time, transmitting the selected program to the first mobile station;
   after transmitting a first portion of the selected program to the first mobile station, receiving a first feedback message about the program from the first mobile station, the first feedback message comprising information associated with a later portion of the selected program; and
   transmitting a second portion of the selected program to the first mobile station, the second portion determined based on the information in the first feedback message.

2. The method as set forth in claim 1, wherein if the first mobile station is in idle mode, the first message comprises a page message configured to wake the first mobile station.

3. The method as set forth in claim 1, the method further comprising:
   transmitting to an EMBS server the request to be notified of a start time when the selected program will be broadcast;
   receiving from the EMBS server the first message that indicates the start time when the selected program will be broadcast; and
   receiving the selected program from the EMBS server.

4. The method as set forth in claim 1, wherein transmitting to the first mobile station a first message comprises:
   transmitting the first message at a first time if the first mobile station is in a first zone; and
   transmitting the first message at a second time if the first mobile station is in a second zone.

5. The method as set forth in claim 1, wherein the start time is a first time if the mobile station is in a first zone, and the start time is a second time if the mobile station is in a second zone.

6. The method as set forth in claim 3, wherein receiving the selected program from the EMBS server comprises:
   receiving the selected program at a first time if a first base station is located in a first zone; and
   receiving the selected program at a second time if the first base station is located in a second zone.

7. The method as set forth in claim 1, the method further comprising:
   receiving from the first mobile station a registration for the selected program, the registration allowing the first mobile station to play the selected program.

8. The method as set forth in claim 1, the method further comprising:
   after transmitting the second portion of the selected program to the first mobile station, receiving a second feedback message about the program from the first mobile station.

9. An Evolved Multicast Broadcast System (EMBS) wireless communication network comprising:
   a plurality of base stations, each of the base stations configured to provide point-to-multipoint communications to a plurality of mobile stations, wherein each base station is further configured to:
      receive from a first mobile station a request to be notified of a start time when a selected program will be broadcast;
      transmit to the first mobile station a first message that indicates the start time when the selected program will be broadcast;
      at the start time, transmit the selected program to the first mobile station;
      after transmission of a first portion of the selected program to the first mobile station, receive a first feedback message about the program from the first mobile station, the first feedback message comprising information associated with a later portion of the selected program; and
      transmit a second portion of the selected program to the first mobile station, the second portion determined based on the information in the first feedback message.

10. The EMBS wireless communication network as set forth in claim 9, wherein if the first mobile station is in idle mode, the first message comprises a page message configured to wake the first mobile station.

11. The EMBS wireless communication network as set forth in claim 9, wherein each base station is further configured to:
   transmit to an EMBS server the request to be notified of a start time when the selected program will be broadcast; and
   receive from the EMBS server the first message that indicates the start time when the selected program will be broadcast;
   receive the selected program from the EMBS server.

12. The EMBS wireless communication network as set forth in claim 9, wherein each base station is further configured to:
   transmit the first message at a first time if the first mobile station is in a first zone; and
   transmit the first message at a second time if the first mobile station is in a second zone.

13. The EMBS wireless communication network as set forth in claim 9, wherein the start time is a first time if the mobile station is in a first zone, and the start time is a second time if the mobile station is in a second zone.

14. The EMBS wireless communication network as set forth in claim 11, wherein each base station is further configured to:
   receive the selected program at a first time if the base station is located in a first zone; and
   receive the selected program at a second time if the base station is located in a second zone.

15. The EMBS wireless communication network as set forth in claim 9, wherein each base station is further configured to:
   receive from the first mobile station a registration for the selected program, the registration allowing the first mobile station to play the selected program.

16. A mobile station capable of accessing an Evolved Multicast Broadcast System (EMBS) wireless network that provides point-to-multipoint communications, the mobile station configured to:
   request from the wireless network a notification of a start time when a selected program will be broadcast;
   receive from the wireless network a first message that indicates the start time when the selected program will be broadcast;
   at the start time, receive the selected program from the wireless network;
   after receiving from the wireless network a first portion of the selected program, send a first feedback message about the program to the wireless network, the first feedback message comprising information associated with a later portion of the selected program; and
   receiving from the wireless network a second portion of the selected program, the second portion determined based on the information in the first feedback message.

17. The mobile station as set forth in claim 16, the mobile station further configured to:
   if in idle mode, switch to active mode upon receiving the first message that indicates the start time when the selected program will be broadcast.

18. The mobile station as set forth in claim 16, the mobile station further configured to:
   transmit to the wireless network a registration for the selected program, the registration allowing the mobile station to play the selected program.

19. The mobile station as set forth in claim 16, the mobile station further configured to:
   receive the first message at a first time if the first mobile station is in a first zone; and
   receive the first message at a second time if the first mobile station is in a second zone.

20. The mobile station as set forth in claim 16, wherein the start time is a first time if the mobile station is in a first zone, and the start time is a second time if the mobile station is in a second zone.

* * * * *